United States Patent
Avenell

(10) Patent No.: US 6,183,584 B1
(45) Date of Patent: Feb. 6, 2001

(54) METHOD FOR SPLICING DRIP IRRIGATION HOSES USING TWO MEMBER SPLICING COUPLING

(75) Inventor: Scott K. Avenell, San Diego, CA (US)

(73) Assignee: T-Systems International, Inc., San Diego, CA (US)

( * ) Notice: Under 35 U.S.C. 154(b), the term of this patent shall be extended for 0 days.

(21) Appl. No.: 09/283,494

(22) Filed: Apr. 1, 1999

Related U.S. Application Data

(60) Provisional application No. 60/080,690, filed on Apr. 3, 1998, and provisional application No. 60/081,827, filed on Apr. 15, 1998.

(51) Int. Cl.[7] .............................. F16L 21/00; F16L 31/00
(52) U.S. Cl. .......................... 156/158; 156/218; 156/227; 156/304.2; 156/304.3; 156/304.6; 156/290; 156/294
(58) Field of Search ..................................... 156/158, 294, 156/304.2, 304.3, 304.6, 203, 217, 218, 227, 309.6, 290

(56) References Cited

U.S. PATENT DOCUMENTS

| | | | |
|---|---|---|---|
| 3,612,580 | 10/1971 | Jones . | |
| 4,092,193 | 5/1978 | Brooks . | |
| 4,099,749 | 7/1978 | van Vliet . | |
| 4,465,309 | * 8/1984 | Nimke et al. | 285/373 |
| 4,610,742 | * 9/1986 | Rop et al. | 156/158 |
| 5,252,162 | 10/1993 | Delmer . | |
| 5,690,769 | 11/1997 | Daigle et al. . | |

* cited by examiner

Primary Examiner—Sam Chuan Yao
(74) Attorney, Agent, or Firm—Christie, Parker & Hale, LLP

(57) ABSTRACT

A splicing coupling and a method using a splicing coupling is provided for splicing a pair of drip irrigation hoses. The splicing coupling has an inner and outer member. Each member has a heat activatable bondable surface opposite a non-bondable surface. Each member is circuitous. The inner member is formed with the bondable surface on the outside and the non-bondable surface on the inside, while the outer member is formed with the bondable surface on the inside and the non-bondable surface on the outside. Typically, the inner member is preferably bonded to the outer member along a bond line midway between the members and perpendicular to the longitudinal axis of the members. To form a splice, an end of a first hose is slid over the inner member but under the outer member until it abuts against the bond line. An end of a second hose to be spliced is slid over the other end of the inner member and underneath the outer member until it abuts the bond line. The hoses are then collapsed and the bondable surfaces of the coupling members are activated causing the inner and outer members of the coupling to bond with the inner and outer surfaces of the hose ends, respectively, forming the splice.

12 Claims, 4 Drawing Sheets

METHOD FOR SPLICING DRIP IRRIGATION HOSES USING TWO MEMBER SPLICING COUPLING

CROSS REFERENCE TO RELATED APPLICATIONS

This application claims priority and is based on Provisional Application No. 60/080,690, filed on Apr. 3, 1998, and on Provisional Application No. 60/081,827, filed on Apr. 15, 1998.

FIELD OF THE INVENTION

The present invention relates to a method for splicing together a pair of drip irrigation hoses using splicing coupling as well as to the splicing coupling.

BACKGROUND OF THE INVENTION

Drip irrigation technology is employed throughout the world for use in the agricultural industry. Hoses for performing drip irrigation are typically installed in fields, orchards, vineyards, nurseries, greenhouses, or anywhere in which drip precipitation is desired, both above and below the ground. An example of a plastic drip irrigation hose is T-TAPE TSX, manufactured by T-Systems International, Inc., San Diego, Calif.

Drip irrigation hose can generally be classified into two types: hose having discrete emitters and hose having continuous, integral emitters. An example of a drip irrigation hose having discrete emitters is shown in U.S. Pat. No. 4,850,531. An example of a drip irrigation hose having continuous, integral emitters is shown in U.S. Pat. No. 4,247,051.

In the use of all types of drip irrigation hoses, it is commonly necessary to splice together a pair of hoses. Several techniques are employed to splice irrigation hoses together. One technique comprises splicing hoses together by using wire ties to secure a piece of rigid tubing inserted inside both hoses. A wire tie is wrapped several times around each hose over the section of the hose that overlaps the rigid tubing and the wire tie is twisted to form a water-tight seal. Problems with this technique are that the rigid tubing causes a substantial deformity in the hoses at the splice and the wire ties may work their way loose over time, thereby destroying the integrity of the water-tight seal.

Another technique is splicing together drip irrigation hoses using a screw-on connector. An internally threaded connector is fit over the outside of each of the irrigation hoses. An externally threaded cylindrical insert is then inserted into both ends of the hoses. The threads on each end of the insert are diametrically oriented. The outer connectors are threaded onto the insert with the irrigation hoses frictionally and engageably squeezed between each of the outer connectors and the insert to form a water-tight seal. A problem with this technique is that a substantial deformity is formed in the hoses at the splice. Moreover, the connectors are bulkier and are harder to handle in the field.

Therefore, there is a need for a technique for splicing together drip irrigation hoses which maintains a permanent water-tight seal and does not result in a substantial deformity at the splice.

SUMMARY OF THE INVENTION

A method is provided incorporating a splicing coupling for splicing together a pair of drip irrigation hoses. The splicing coupling has an inner and an outer member. Each member is formed from a sheet of material having a heat activatable bondable surface opposite a non-bondable surface. Preferably, the bondable surface is a Polyethylene layer while the non-bondable surface is a Mylar layer. The two layers are held together to form the sheet by a tie layer sandwiched between the two layers. The resulting sheet material typically has a thickness in the range of 0.006 inch and is sometimes referred to as a polymylar sheet.

Each member of the coupling is formed by folding a rectangular section of the sheet longitudinally to form overlapping margins. The inner member is formed with the bondable surface on the outside and the non-bondable surface on the inside. The outer member, is formed with the bondable surface on the inside and the non-bondable surface on the outside. To facilitate handling, it is preferable that the inner member is bonded to the outer member. Preferably, this is accomplished by unfolding the outer member and placing the inner member on the section of the outer member between the two folds that form the outer member. Both members should be longitudinally aligned. It is also preferable that the overlapped ends of the inner member face the inner surface of the outer member located between the two folds. In a preferred embodiment, the inner member is bonded to the outer member by placing a heating wire against the outer surface of the outer member such that it is perpendicular to the longitudinal axis of the outer member and such that it makes contact with a portion of the outer member between the two folds. The heating wire is then heated activating the inner bondable surface of the outer member as well as the outer bondable surface of the inner member causing the members to bond along a line corresponding to the position of the heating element. This line is commonly referred to as a bond line.

In preparing to form a splice on the field, the ends of the hoses to be spliced should be cleaned to remove soil and other dirt that may have accumulated on their inner and outer surfaces. Wiping with a clean cloth may be sufficient. To form the splice, the end of the first hose to be spliced is slid over the inner member and under the outer member until it abuts against the bond line. The end of the second hose to be spliced is slid over the other end of the inner member and under the outer member until it also makes contact with the bond line. To facilitate this process, the outer member should preferably be unfolded as the hose ends are slid over the inner member. The outer member is then folded over the outer surfaces of the hose ends. Heat and pressure are then applied preferably by a thermal impulse heater which collapses the coupling and hoses while applying heat, causing the bondable surfaces of the inner and outer members to activate and bond to the inner and outer surfaces of the hoses, respectively. Because the inner surface of the inner member is nonbondable, the inner surfaces do not bond against each other and thereby do not create an obstacle to the flow through the splice. Similarly, the non-bondable outer surface of the outer member will not bond to the heat and pressure applying device.

DETAILED DESCRIPTION

Figure 1:
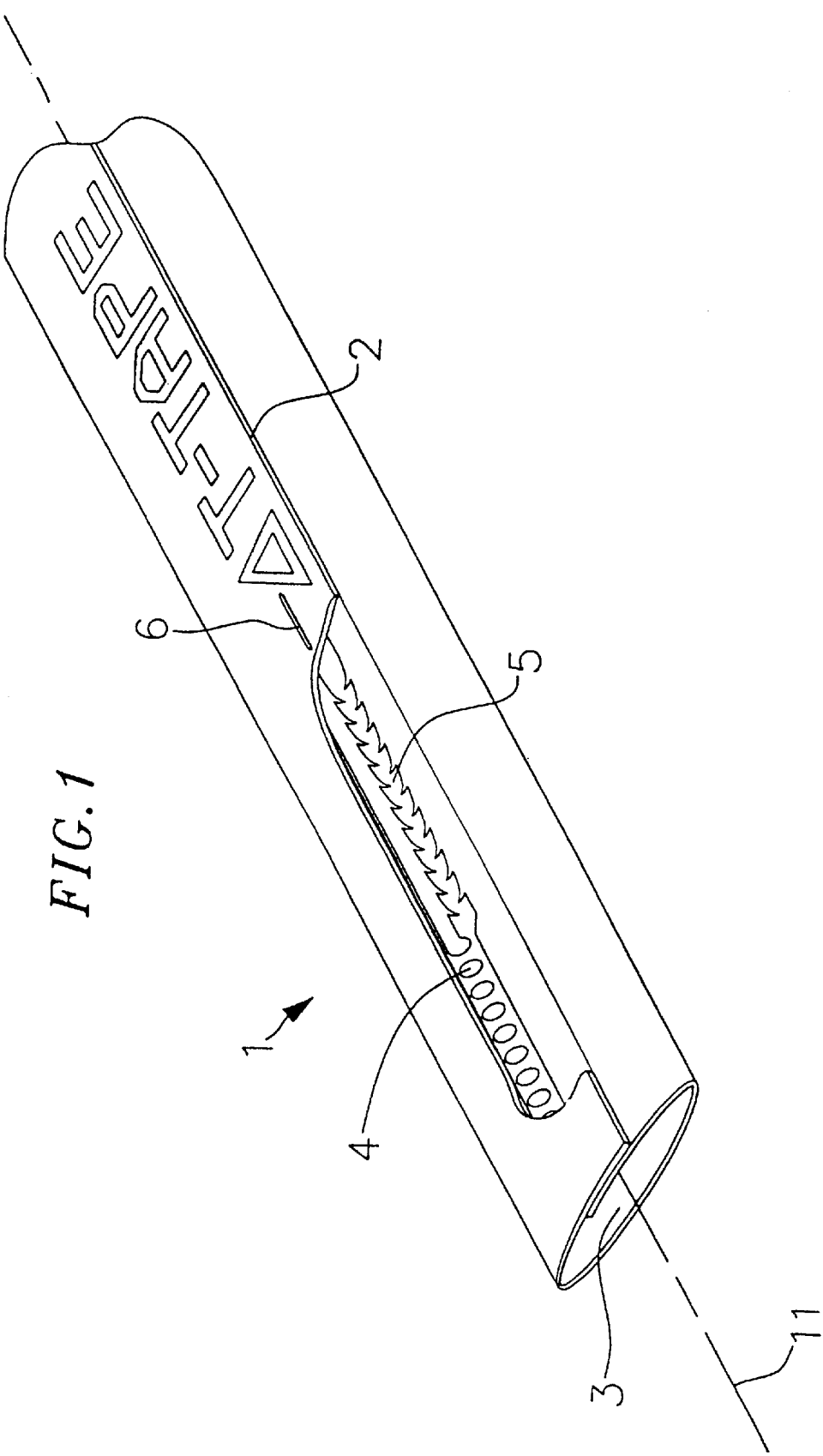
FIG. 1 is a perspective view of a drip irrigation hose.

The present invention relates to a method for splicing drip irrigation hoses using a splicing coupling and to the splicing coupling as an article of manufacture. A view depicting a drip irrigation hose to which the present invention relates is shown in FIG. 1. The drip irrigation hose 1 is constructed from an elongated strip of plastic film, preferably ranging in thickness from 4 mil to 15 mil, although the present method will work with other thicknesses of plastic film. The strip of plastic film is folded longitudinally to form overlapping margins. The resulting hose 1 has a generally flattened ovoidal shape when not pressurized. The hose 1 also forms a supply tube 3 on the inside and parallel longitudinal seals that connect the overlapping margins to define a longitudinal track 2 along an upper wall of the hose.

In the exemplary hose, a series of self contained, mutually sealed sections are defined longitudinally within the overlapping margins. Each sealed section comprises a series of inlets, channels and a slit outlet followed by a seal to prevent water from flowing between adjacent sealed sections. Each section operates independently of the other sections. Inlets 4 are defined longitudinally along the inward facing side of the track 2 to permit water flow from supply tube 3 to track 2. Turbulent flow regulating channels 5 extend longitudinally along track 2 from the inlets 4 to a slit outlet 6 through which water passes to the external surroundings to effect irrigation. The series of inlets 4, channels 5, and slit outlet 6 is repeated along the longitudinal length of the hose 1.

Each hose end to be spliced is cut preferably at an angle perpendicular to a longitudinal axis 11 of each hose and at a location centered between a pair of slit outlets 6. Each section of excess hose should be discarded. Although the track orientation during splicing is immaterial to the present invention and the respective tracks can either be aligned or on opposite sides, it is preferable that the tracks are aligned.

Figure 2:
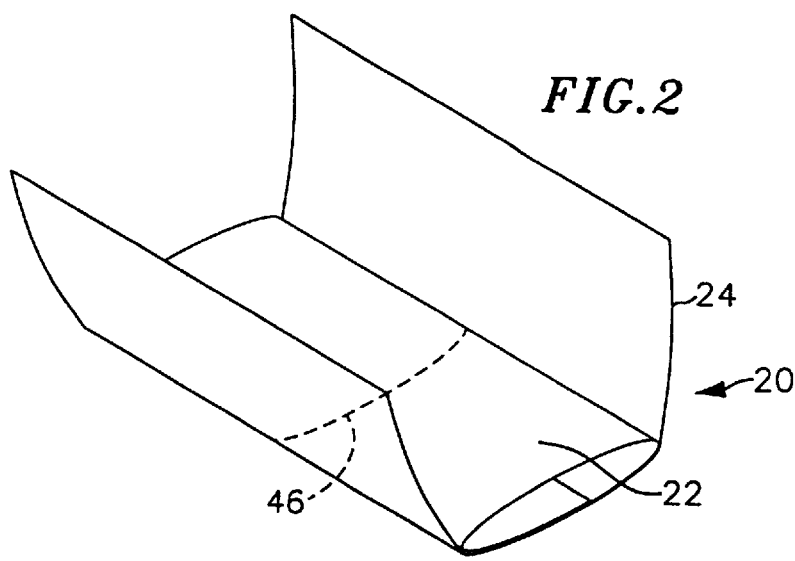
FIG. 2 is a perspective view of a splicing coupling.
Figure 3:
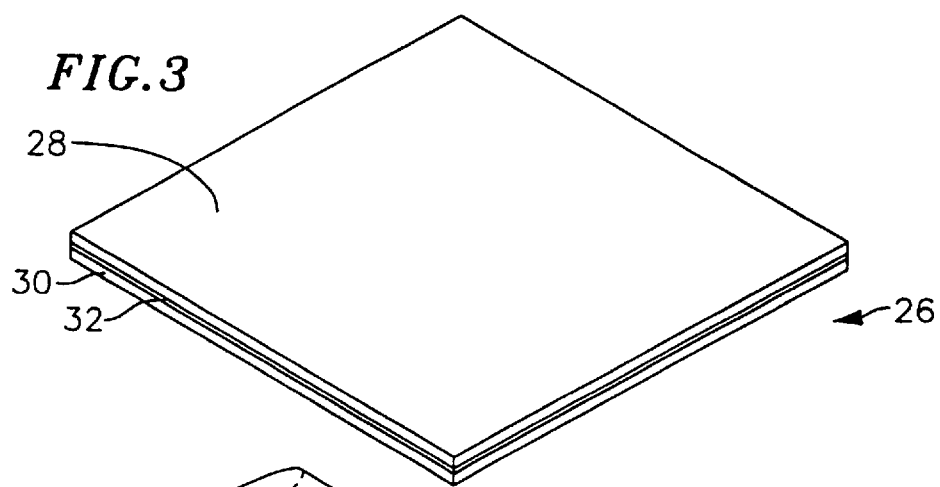
FIG. 3 is a perspective view of a sheet of polymylar for forming an inner or outer member of the splicing coupling.

A splicing coupling 20 consisting of an inner member 22 and an outer 24 member is used to splice the two hose ends together (FIG. 2). Each member is formed from a sheet of material 26 having a heat activatable bondable surface 28 opposite a non-bondable surface 30 (FIG. 3). Preferably the bondable surface is a Polyethylene layer while the non-bondable surface is a Mylar layer. The bondable surface may be made from materials other than Polyethylene. The non-bondable surface may be made from materials other than Mylar and may even be a textile. Typically, the non-bondable surface should be incompatible with the bondable surface. The two layers (i.e., surfaces) are held together to form the sheet using a tie layer 32 sandwiched between the two layers. A tie layer is typically an adhesive material that is capable of adhering to two preferably dissimilar or incompatible materials, as for example, Polyethylene and Mylar. The resulting sheet material has a thickness typically in the range of 0.006 inch. When a sheet is formed using Polyethylene and Mylar, the sheet is sometimes referred to as a polymylar sheet.

Figure 4A:
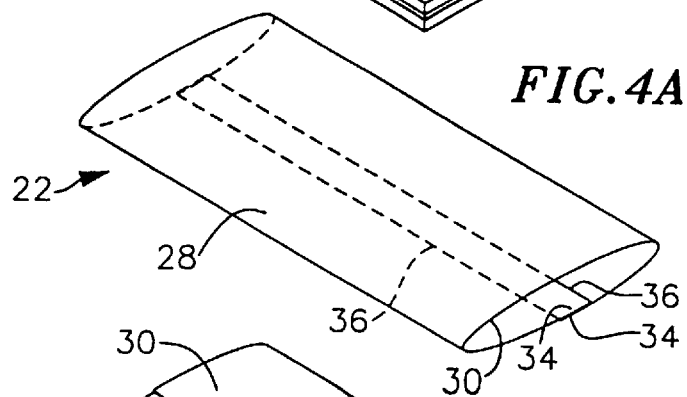
FIG. 4A is a perspective view of a splicing coupling inner member.
Figure 4B:
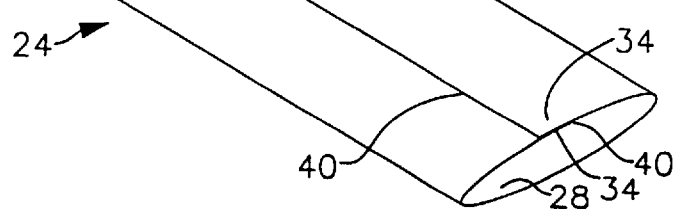
FIG. 4B is a perspective view of a splicing coupling outer member.

To form the coupling inner member, a rectangular section of the sheet is folded longitudinally to form overlapping margins 34 (FIG. 4A). In other words, two opposite longitudinally ends 36 of the sheet are folded over so as to overlap each other. When a sheet is folded to form the inner member, the bondable surface 28 is on the outside of the folded member while the non-bondable surface 30 is on the inside. The outer member of the splicing coupling is formed in a similar manner with the exception that the bondable surface 28 is on the inside of the member while the non-bondable surface 30 is on the outside (FIG. 4B). Both coupling members are circuitous when their ends overlap each other.

Figure 5:
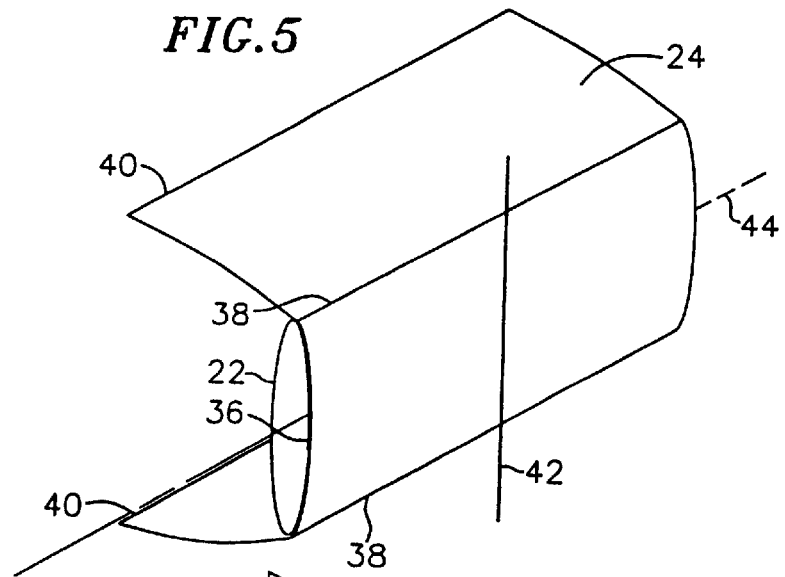
FIG. 5 is a perspective view of the splicing coupling being heated with a heating wire.

The inner member should be formed to fit inside the ends of the hoses to be spliced whereas the outer member should be formed to fit over and surround the outside surfaces of the hose ends to be spliced. To facilitate handling, it is preferred that the inner member is bonded to the outer member. Preferably this is accomplished by unfolding the outer member and placing the inner member on the section of the outer member between the two folds 38 (FIG. 5). Both members should be longitudinally aligned. It is also preferable that the overlapped ends 36 of the inner member face the inner surface of the outer member located between the two folds 38. In this regard, when the ends 40 of the outer member are folded over the inner member, the folded ends of the outer member are opposite the folded ends of the inner member. Of course, the inner member may be positioned within the outer member such that the folded ends of each member are adjacent.

The inner member may be bonded to the outer member. In the preferred embodiment, the inner member is bonded to the outer member by placing a heating wire 42 against the outer surface of the outer member such that it makes contact with a portion of the outer member between the folds 38. The heating wire is placed, preferably, perpendicular to the longitudinal axes 44 of the members at a location midway along the members length. As the heating wire heats, it activates the inner bondable surface of the outer member as well as the outer bondable surface of the inner member causing the members to bond along a line 46 (FIG. 6) corresponding to the position of the heating element. This line is referred to herein as the bond line. Once bonded, the outer member overlapping ends are able to unfold, whereas the inner member overlapping ends are kept overlapped. In other words, the inner member folded ends cannot unfold. Of course, as it would be apparent to one skilled in the art, the outer member ends can be folded over the inner member and the heating wire can be placed across the folded ends of the outer member perpendicular to the outer member longitudinal axis. In other embodiments, the two members may be bonded to each other at a point instead of along a line or they may be bonded to each other along a certain area.

Figure 6:
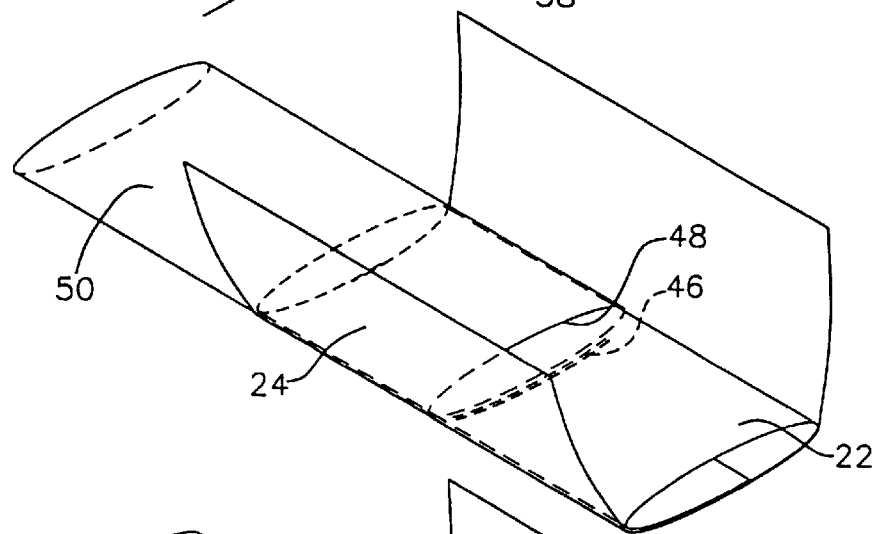
FIG. 6 is a perspective view of a first hose mated to a splicing coupling.
Figure 7:
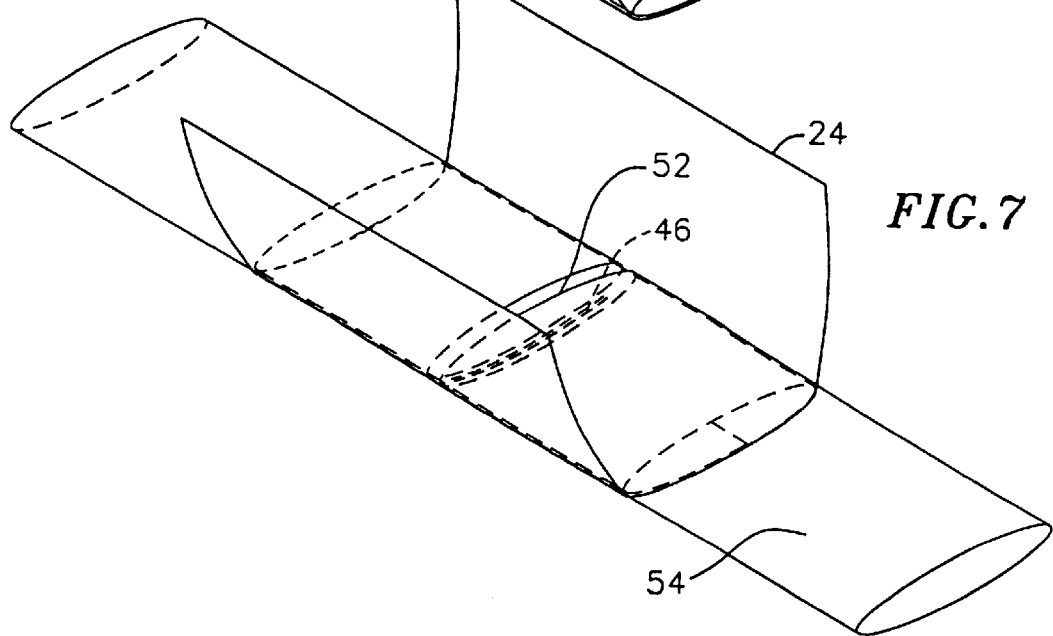
FIG. 7 is a perspective view of two hoses to be spliced mated to a splicing coupling.
Figure 8:
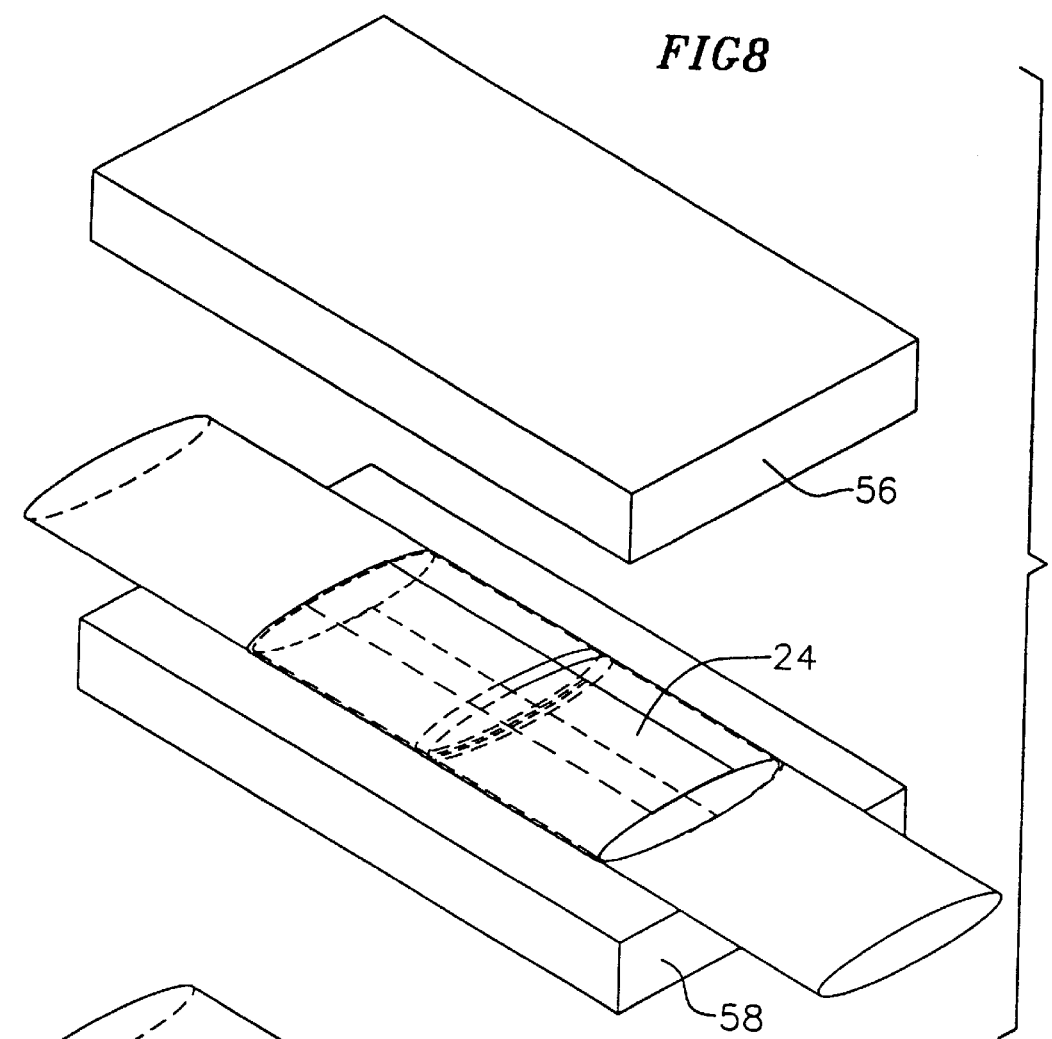
FIG. 8 is a perspective view of an impulse heater about to apply heat and pressure to a splicing coupling mated to two hoses to be spliced.

To splice the ends of two hoses using the preferred embodiment splicing coupling, the outer member is unfolded and an end 48 of a first hose 50 is slid over the inner member while the outer member is positioned over the outer surface of the hose end. The end of the hose is pushed over the inner member until it makes contact with the bond line 46 (FIG. 6). This is easy to accomplish since the hose is itself formed by a strip of plastic folded longitudinally to form overlapping margins. The end 52 of a second hose 54 to be spliced is slid over the other end of the inner member until it makes contact with the bond line 46 (FIG. 7). Again, the outer member should be outside of the second hose outer surface. As can be seen, the bond line between the inner and the outer member facilitates the use of the splicing coupling by providing an easily ascertainable location up to which the hose must be slid over the inner member.

Once both hoses that are butted against the bond line, the outer member ends are folded over the hoses and are overlapped. Heat and pressure is then applied as for example via a thermal impulse heater causing the bondable surfaces of both members, which are preferably made from Polyethylene, to activate and thereby bond to the hoses. The bondable surfaces may be activated by melting. The temperature at which the bondable surfaces of the coupling activate is lower than the melting temperature of the hoses. Consequently, use of the splicing coupling allows for the splicing of two hoses without melting the hose ends being spliced. In another embodiment, the temperature at which the bondable surfaces of the coupling activate is about the same as the melting temperature of the hoses. With this embodiment, there is some melting of the hose ends during splicing. It is preferable with this embodiment that the bondable surfaces of the coupling members are made from the same material as the hoses to be spliced. This will eliminate any incompatibility between the bondable surfaces and the hoses. For example, the bondable surfaces should preferably be Polyethylene layers when the hoses are made from Polyethylene. When the bondable surfaces and the hoses are made from the same material or materials having similar melting temperatures, the bondable surfaces and the hose ends being spliced melt when heated to bond to each other.

Figure 9:
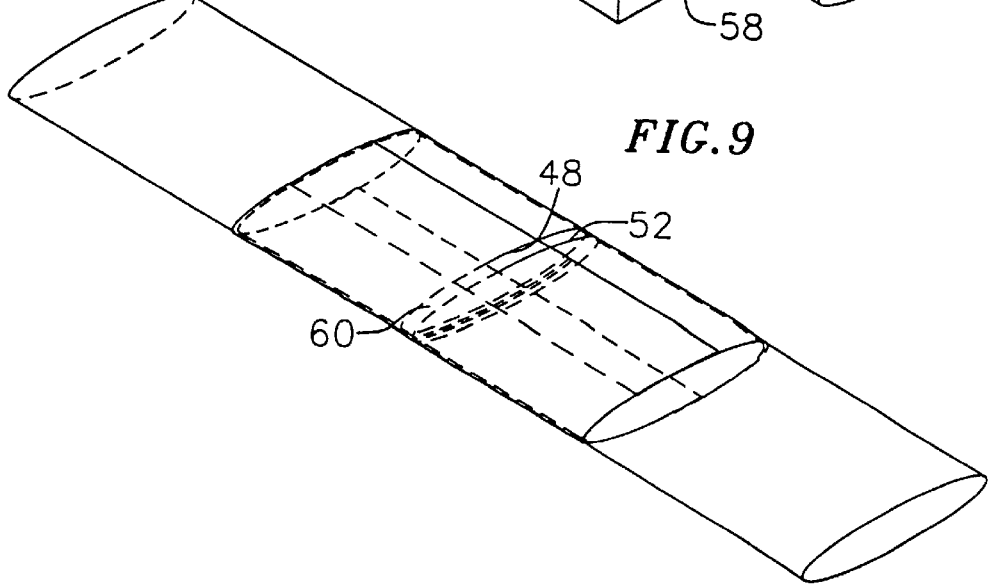
FIG. 9 is a perspective view of a spliced joint formed using a splicing coupling.

An impulse heater typically has an upper member 56 and a lower member 58. Once the hoses are fitted to the splicing coupling, they are placed on the lower member 58 of the impulse heater such that the splicing coupling rests entirely within the lower member (FIG. 9). The two heater members are then moved against each other applying pressure, collapsing the hoses and coupling and applying heat to the splicing coupling. As a result, the outer surface of the inner member bonds to the inner surfaces of both hoses while the inner surface of the outer member bonds to the outer surfaces of both hoses (FIG. 9). Moreover, in the area 60 between the hose ends 48, 52, not occupied by the bond line, the inner member is bonded to the outer member. A piece of tape or other means may be used to keep the ends 36 of the outer member properly overlapped so as to prevent the ends from being improperly folded when pressed between the upper and lower member of the impulse heater. After the splice has formed, the tape or other means can be removed.

As is apparent, during the heating and pressure application the coupling members and the hose ends are collapsed whereby the inner surfaces of the inner member make contact under pressure. However, since the inner surface of the inner member is non-bondable, these surfaces do not bond against each other and thereby do not create an obstacle to the flow through the spliced hoses. Similarly since the outer surface of the outer member is not bondable, the outer member does not bond to the impulse heater.

As it would become apparent to one skilled in the art, if the bondable surfaces of the coupling members are not heat activatable, as for example if they are pressure activatable then heat will not need to be applied. It should be noted bondable surface that are chemically activatable may also be used. For example, a bondable surface may be of the type that chemically activates when in contact with a hose surface. In such case, heat or pressure may not need to be applied.

As can be seen, the splicing coupling provides for an easy splicing technique for splicing irrigation hoses and allows for the splicing of such hoses to be accomplished on the field. For example, a portable impulse heater may be used on the field along with the splicing coupling for easy splicing of the irrigation hoses.

As it will become apparent to one skilled in the art, it is not necessary that the coupling members are bonded to each other. For example, the inner member may be formed and inserted into the ends of the two hoses to be spliced. An outer member is then placed and folded over the outer surfaces of the hoses to be spliced. With this embodiment, the hose ends may be abutted together, may overlap or may even be spaced apart. Pressure and heat are then applied as described above to form the splice.

In another embodiment, the members are tubular (i.e., they do not have overlapping ends) and are collapsed. Again, the inner member has a bondable outer surface and non-bondable inner surface while the outer member has a bondable inner surface and a non-bondable outer surface. These members may also be bonded to each other.

The coupling members may be of the same color. For example, they may be clear or they may be black. However, a black outer member is preferred so as to inhibit the ultra violet degradation of the member caused by exposure to the sun. In this regard, the life of the outer member is prolonged. To differentiate between the two members, it may be worthwhile to use a different color inner layer member such as a clear inner member and a black outer member.

What is claimed is:

1. A method for splicing two drip irrigation hoses comprising the steps of:

folding a first end portion of a first plastic sheet having a bondable surface opposite a non-bondable surface wherein the bondable surface is on the outside of the fold;

folding a second end portion of the first sheet wherein the bondable surface remains outside of the fold;

placing a second plastic sheet having a bondable surface opposite non-bondable surface around the first folded sheet with the second sheet bondable surface facing the first sheet bondable surface;

bonding a portion of the first folded sheet to the second sheet;

thereafter, placing a portion of the first folded sheet inside the end of a first hose to be spliced, wherein the bondable surface is adjacent the inner surface of the first hose;

placing the remaining portion of the first folded sheet inside the end of a second hose to be spliced wherein the bondable surface is adjacent the inner surface of the second hose;

surrounding the two hose ends with the second plastic sheet with the bondable surface of the second sheet adjacent to the outer surface of the hoses; and activating the bondable surfaces of the first and second sheets bonding them to the inner and outer surfaces of the hoses forming a splice.

2. A method as recited in claim 1 wherein the steps of folding comprise the steps of folding the two end portions of the first sheet to form folds parallel to each other.

3. A method as recited in claim 2 wherein the steps of folding comprise the steps of folding the two end portions such that the distance between the two folds is slightly smaller than the width of each hose when collapsed.

4. A method as recited in claim 1 wherein the step of folding the second end portion comprises the step of folding the second end so as to overlap the first folded end portion.

5. A method as recited in claim 1 further comprising the steps of:

folding a first end portion of the second sheet wherein the bondable surface of the second sheet is on the inside of the fold; and folding a second end portion of the second sheet wherein the bondable surface of the second sheet remains inside of the fold.

6. A method as recited in claim 5 wherein the steps of folding the second sheet comprise the steps of folding the two end portions of the second sheet to form folds parallel to each other.

7. A method as recited in claim 6 wherein the steps of folding the end portions of the second sheet comprise the steps of folding the end portions of the second sheet such that the distance between the two folds on the second sheet is slightly greater than the width of each hose when collapsed.

8. A method as recited in claim 5 wherein the step of folding the second end portion of the second sheet comprises the step of folding the second end portion of the second sheet so as to overlap the folded first end portion of the second sheet.

9. A method as recited in claim 1 wherein the bondable surfaces of the first and second sheets are made from the same material as the hoses to be spliced and wherein the step of activating comprises the step of melting the bondable surfaces of the first and second sheets.

10. A method as recited in claim 1 wherein the step of activating comprises the step of heating the bondable surfaces of the first and second sheets.

11. A method as recited in claim 1 wherein the step of activating the bondable surfaces comprises the step of chemically activating the bondable surfaces of the first and second sheets.

12. A method as recited in claim 11 wherein the step of activating consists of bringing the bondable surfaces of the first and second sheets in contact with the hoses to be spliced.

* * * * *